Figure 1:
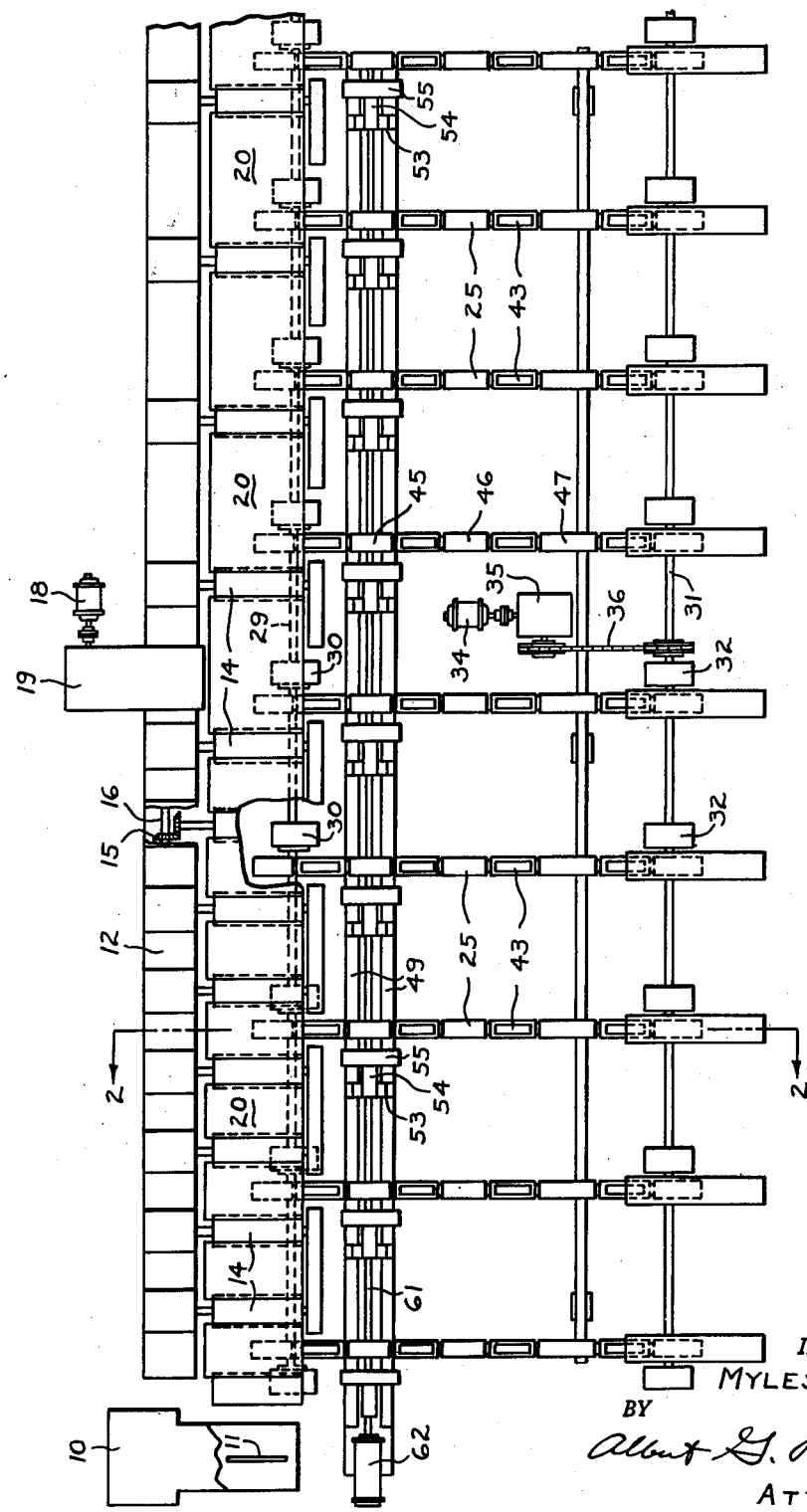

Aug. 19, 1952 — M. MORGAN — 2,607,467
APPARATUS FOR HANDLING METAL BARS
Filed Oct. 12, 1948 — 3 Sheets-Sheet 1

INVENTOR.
MYLES MORGAN
BY
Albert G. Blodgett
ATTORNEY

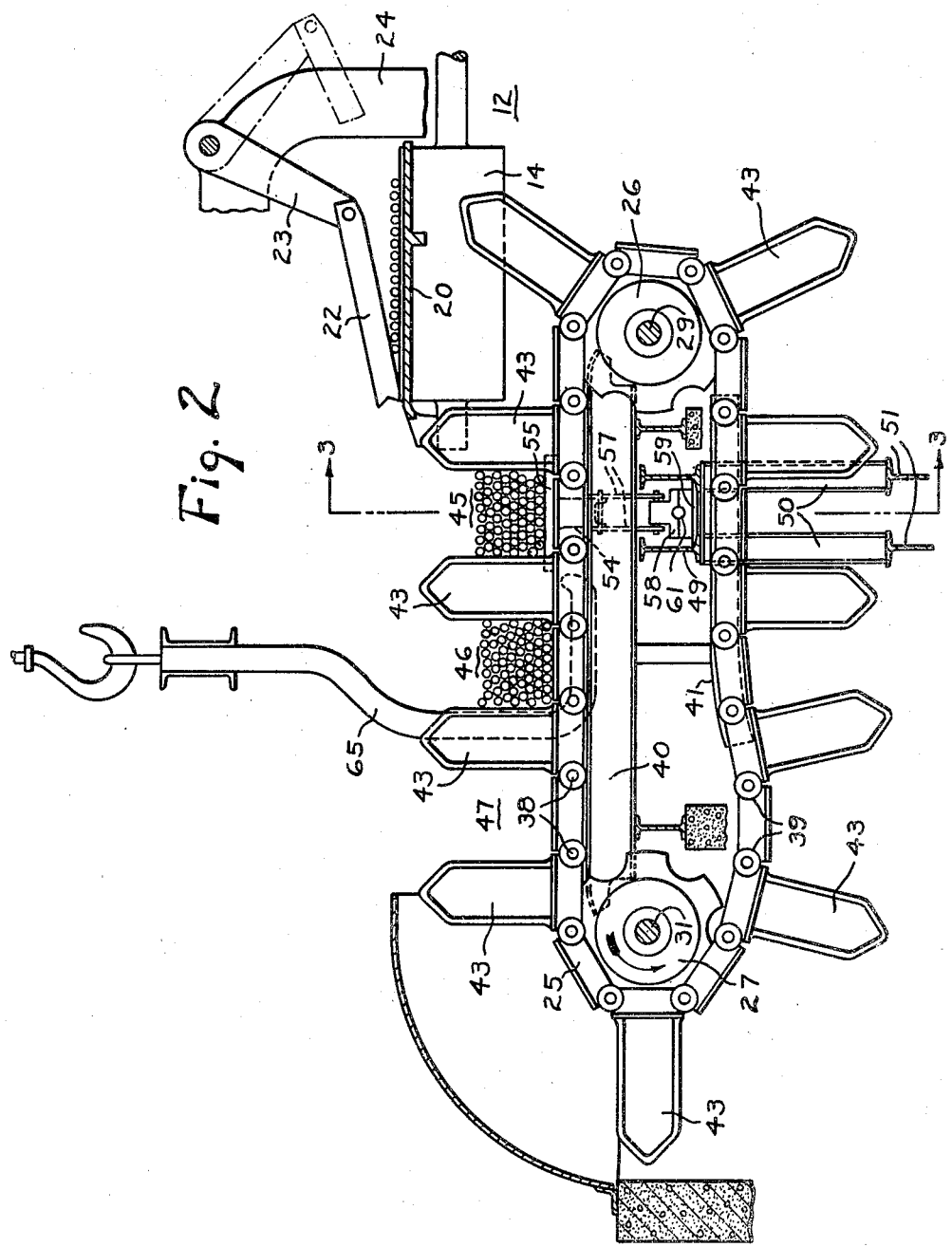

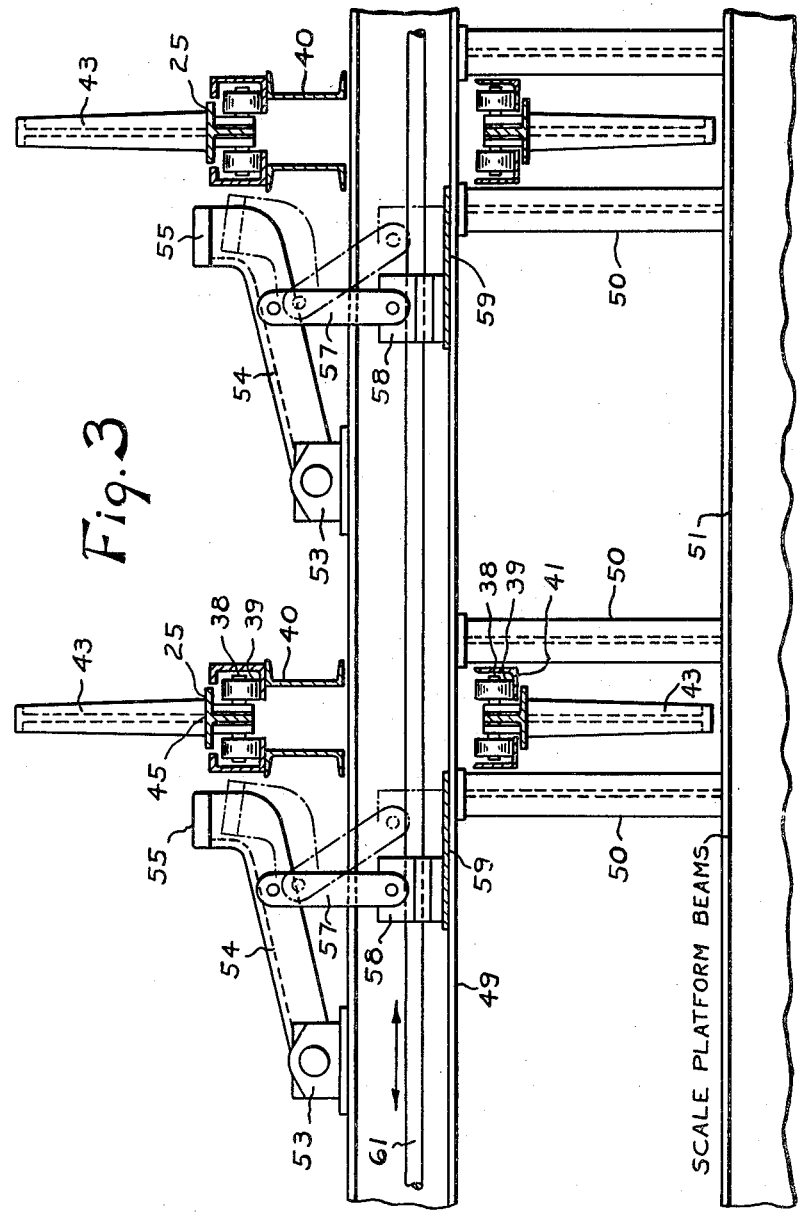

Patented Aug. 19, 1952

2,607,467

UNITED STATES PATENT OFFICE 2,607,467

APPARATUS FOR HANDLING METAL BARS

Myles Morgan, Worcester, Mass., assignor to Morgan Construction Company, Worcester, Mass., a corporation of Massachusetts Application October 12, 1948, Serial No. 54,110

3 Claims. (Cl. 198—39)

This invention relates to apparatus for handling metal bars, and more particularly to a mechanism for facilitating the handling of bars from the back shear table of a rolling mill.

It is a common practice to provide a bin at one side of the back shear table in position to receive the metal bars as they are transferred broadside from the table. After a sufficient or desired number of bars have been deposited in the bin, it is necessary to cease transferring bars until the bars already in the bin have been properly tied to form a bundle, and the bundle has been lifted from the bin by a crane. This tying of the bars requires an appreciable time, and furthermore the crane is not always available immediately when its services are required. Consequently, it often happens that the operation of the back shear table is seriously delayed.

It is accordingly one object of the invention to provide, in combination with a back shear table, an apparatus to facilitate the tying of the bars from the table into bundles and the removal of the bundles.

It is a further object of the invention to combine with a back shear table a mechanism such that the bars from the table may be grouped and tied in a series of bundles without delaying the operation of the table.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a plan view of a back shear table and associated apparatus for handling metal bars;

Fig. 2 is an enlarged view in section taken substantially on the line 2—2 of Fig. 1; and Fig. 3 is a further enlarged fragmentary view in section taken substantially on the line 3—3 of Fig. 2.

In Fig. 1 there is indicated the usual bar shear 10 having a lower shear knife 11 and a cooperating upper knife (not shown). An elongated back shear table 12 is located in alignment with the shear. This table 12 is of the usual construction comprising a series of horizontal rollers 14 by which metal bars may be supported and moved longitudinally. Each roller is connected by bevel gearing 15 to a longitudinally extending main drive shaft 16. This shaft 16 is driven by an electric motor 18 through suitable speed reducing gearing enclosed within a housing 19. The usual horizontal guide plates 20 are provided between the rollers 14. It will be understood that rolled metal bars travel longitudinally past the shear 10 and along the table 12 until the front ends of the bars engage a suitable stop (not shown), whereupon the shear is actuated to sever the bars, usually in groups of laterally adjacent bars. The bars are then transferred broadside from the rollers 14 by means of push-off dogs 22 (Fig. 2) of well-known construction carried by swinging arms 23 which depend from supporting posts 24. The dogs 22 are pivotally connected to the arms 23 to form an articulated construction such that the free ends of the dogs may rest by gravity on the tops of the bars, and the number of bars to be pushed off by the dogs will be determined by the length of the stroke given to the dogs.

The invention provides, in combination with these various parts, an improved mechanism for receiving and handling the bars which are pushed from the rollers 14. For this purpose a number of spaced parallel endless chains 25 are arranged at substantially right angles with the back shear table 12, each chain having a generally horizontal upper run. Each of these chains is carried at its inner end (adjacent the back shear table) by a sprocket wheel 26 (Fig. 2) and at its outer end by a sprocket wheel 27. The inner sprocket wheels 26 are mounted on a shaft 29 rotatably supported in bearings 30 (Fig. 1), and the outer sprocket wheels 27 are mounted on a shaft 31 rotatably supported in bearings 32. The outer shaft 31 is driven intermittently, under suitable manual control, by an electric motor 34 through a speed-reducing mechanism 35 and a chain-and-sprocket wheel connection 36. The links of the chains 25 are pivotally connected by pins 38 which carry rollers 39 on their ends in known manner, these rollers resting on suitable tracks 40 (Fig. 3) adjacent the upper runs of the chains and on suitable tracks 41 adjacent the lower runs of the chains.

Each of the chains 25 is so constructed as to provide a plurality of notches or pockets along the upper run of the chain for the reception of the metal bars. In the preferred construction certain of the chain links are provided with prongs 43 which extend upwardly, when the links are in the upper run, to form the vertical sides of these pockets. In the embodiment illustrated, there is a prong 43 on each alternate link of the chain. As shown in Fig. 2 there are three bar-receiving pockets 45, 46, and 47, the pocket 45 being nearest to the table 12 in position to receive bars directly therefrom, and the pockets 46 and 47 being located progressively further from the table.

It is desirable in many cases for the operator to be able to weigh the bars which are deposited in the first pocket 45. For this purpose a pair of horizontal beams 49 extend parallel with the back shear table 12 and between the upper and lower runs of the chains 25, in a position beneath the pocket 45. These beams are carried on upright struts 50 which in turn are supported on a pair of scale platform beams 51 located beneath the lower runs of the chains. Blocks 53 are mounted on the beams 49 adjacent the chains 25, and on each of these blocks there is fulcrumed one end of a lever 54 having a transverse shoe 55 on its other end. Each lever 54 is connected by a pair of parallel links 57 to a block 58 therebeneath, these blocks being slidable longitudinally of the beams 49 on plates 59 carried by these beams. All of the blocks 58 are connected to a long horizontal rod 61 which can be moved longitudinally by a suitable fluid motor 62 (Fig. 1) carried by the beams 49. These various parts are so constructed and arranged that with the levers 54 in their raised positions as shown in full lines in Fig. 3, the shoes 55 will be located above the level of the bottom of the chain pocket 45, and the metal bars in this pocket will rest upon these shoes. Thus the weight of the bars will be transferred through the struts 50 to the scale platform beams 51 and this weight can be readily determined in known manner. By means of the motor 62 the rod 61 can be moved longitudinally to slide the blocks 58 and lower the levers 54 to the broken line positions shown in Fig. 3, with the shoes 55 below the level of the bottom of the chain pocket 45. The weight of the bars will then rest directly on the chains 25.

The operation of the invention will now be apparent from the above disclosure. With the shoes 55 in their raised positions, sheared metal bars will be transferred broadside from the back shear table 12 into the adjacent chain pocket 45 by means of the push-off dogs 22, until the desired weight of bars has been accumulated. In the meantime, workmen may tie up a previously delivered bundle of bars in the second chain pocket 46 and remove the tied bundle by means of a well-known form of crane-supported hook mechanism 65 (Fig. 2). As soon as the required weight of bars has been delivered to the first pocket 45, the shoes 55 will be lowered by means of the motor 62, and the motor 34 will be energized to advance all the chains 25 a distance equal to the center-to-center spacing of the prongs 43, thus bringing each prong into the position previously occupied by the prong next in advance thereof. The shoes 55 will then be raised, and the transfer of the bars from the back shear table will be continued. The chain pocket 47 provides a third or extra unloading position into which a tied bundle may be carried by the chain in the event the services of the crane are not available in time to remove the bundle from the pocket 46. Thus there is very little danger that the removal of the bars from the back shear table will be held up by a delay in the tying and removal of the bundles from the chains 25.

Having thus described my invention, what I claim as new and desire to secure by Letters Patent is:

1. Apparatus for handling metal bars comprising a back shear table of the roller conveyor type arranged to convey bars longitudinally and to support a plurality of sheared bars simultaneously in laterally adjacent positions, dogs reciprocable transversely above the roller conveyor to push bars broadside therefrom, the dogs being arranged to rest by gravity on the tops of the bars in such a manner that the number of bars to be pushed by the dogs will be determined by the length of stroke given to the dogs, an endless chain conveyor extending transversely from one side of the roller conveyor and providing a series of pockets one of which is in position to receive bars pushed from the roller conveyor by the dogs, and means to drive the endless conveyor intermittently and thereby move a filled pocket away from the roller conveyor while moving an empty pocket into bar-receiving position.

2. Apparatus for handling metal bars comprising a back shear table of the roller conveyor type arranged to convey bars longitudinally and to support a plurality of sheared bars simultaneously in laterally adjacent positions, transfer mechanism operable above the roller conveyor to discharge bars broadside therefrom, an endless chain conveyor extending transversely from one side of the roller conveyor and providing a series of pockets one of which is normally in position to receive bars discharged by the transfer mechanism, a weighing mechanism having a portion arranged to support the weight of the bars as they are deposited in the bar-receiving pocket so that said mechanism may indicate the weight of such bars, means to lower said portion of the weighing mechanism below the level of the bottoms of the pockets, and means to drive the endless chain conveyor intermittently and thereby move a filled pocket away from the roller conveyor while moving an empty pocket into bar-receiving position.

3. Apparatus for handling metal bars comprising a back shear table of the roller conveyor type arranged to convey bars longitudinally and to support a plurality of sheared bars simultaneously in laterally adjacent positions, transfer mechanism operable above the roller conveyor to discharge bars broadside therefrom, a plurality of spaced parallel endless chains extending transversely from one side of the roller conveyor and each having a generally horizontal upper run, each chain having a series of prongs thereon which extend upwardly when they are in the upper run to provide a series of pockets one of which is in position to receive bars discharged by the transfer mechanism, shoes positioned at one side of the chains adjacent the bar-receiving pockets and slightly above the level of the bottoms of the pockets so that the bars discharged by the transfer mechanism will rest on the shoes, weighing mechanism supporting the shoes, means to lower the shoes to positions below the level of the bottoms of the pockets, and means to drive the chains intermittently and thereby move a filled pocket away from the roller conveyor while moving an empty pocket into bar-receiving position.

MYLES MORGAN.

REFERENCES CITED

The following references are of record in the file of this patent:

UNITED STATES PATENTS

| Number | Name | Date |
| --- | --- | --- |
| 923,356 | Hore | June 1, 1909 |
| 997,201 | Mascord | July 4, 1911 |
| 1,221,196 | Lewis | Apr. 3, 1917 |
| 1,295,195 | Parker | Feb. 25, 1919 |
| 1,416,211 | Jupp | May 16, 1922 |
| 1,428,716 | Smith | Sept. 12, 1922 |
| 1,503,670 | Stoop | Aug. 5, 1924 |
| 1,603,865 | Robbins | Oct. 9, 1926 |
| 2,080,858 | Dorman | May 18, 1937 |
| 2,195,535 | Klein | Apr. 2, 1940 |
| 2,311,614 | Walter | Feb. 16, 1943 |
| 2,478,020 | Stiles | Aug. 2, 1949 |
| 2,547,791 | Smith | Apr. 3, 1951 |